US006631776B1

(12) United States Patent
Bomya

(10) Patent No.: US 6,631,776 B1
(45) Date of Patent: Oct. 14, 2003

(54) MAGNETIC SENSOR

(75) Inventor: Timothy J. Bomya, Westland, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/648,601

(22) Filed: Aug. 26, 2000

Related U.S. Application Data

(60) Provisional application No. 60/150,868, filed on Aug. 26, 1999.

(51) Int. Cl.[7] .............................. B62D 1/24; B60Q 1/00; G08G 1/00; B60R 21/32
(52) U.S. Cl. ...................... 180/169; 340/436; 340/904; 280/735
(58) Field of Search ................................ 180/167, 168, 180/169, 271, 274; 280/735; 340/436, 435, 433, 573.1, 903, 904

(56) References Cited

U.S. PATENT DOCUMENTS

| | | | |
|---|---|---|---|
| 1,813,746 A | 7/1931 | Kinsley | 324/243 |
| 3,659,197 A | 4/1972 | Alley et al. | 324/51 |
| 3,794,997 A | * 2/1974 | Iwatsuki et al. | 343/7 ED |
| 3,898,472 A | 8/1975 | Long | 307/10 SB |
| 3,943,376 A | 3/1976 | Long | 307/116 |
| 3,945,459 A | 3/1976 | Oishi et al. | 180/274 |
| 4,087,782 A | 5/1978 | Oishi et al. | 180/271 |
| 4,300,116 A | 11/1981 | Stahovec | 340/32 |
| 4,430,645 A | 2/1984 | Eskandry et al. | 340/572 |
| 4,434,671 A | 3/1984 | Yamashita et al. | 73/862.473 |
| 4,864,298 A | * 9/1989 | Dombrowski | 340/904 |
| 5,134,371 A | 7/1992 | Watanabe et al. | 324/252 |
| 5,177,445 A | 1/1993 | Cross | 324/637 |

(List continued on next page.)

FOREIGN PATENT DOCUMENTS

| | | | |
|---|---|---|---|
| EP | 0 453 824 A1 | 10/1991 | G01B/77/14 |
| JP | 56-157802 | 5/1981 | G01B/77/28 |
| JP | 406144154 A | * 5/1994 | 180/274 |

OTHER PUBLICATIONS

Bomya et al., U.S. application Ser. No. 09/648,528, *Magnetic Sensor*, filed Aug. 26, 2000.
Bomya et al., U.S. application Ser. No. 09/648,606, *Magnetic Sensor*, filed Aug. 26, 2000.
Bomya, U.S. application Ser. No. 09/649,414, *Magnetic Sensor*, filed Aug. 26, 2000.
Bomya, U.S. application Ser. No. 09/649,415, *Magnetic Sensor*, filed Aug. 26, 2000.
Bomya, U.S. application Ser. No. 09/649,416, *Magnetic Sensor*, filed Aug. 26, 2000.
Kwun, H., "Magnetostrictive Sensors Technology", reprinted from Technology Today, Mar., 1995, pp. 3–7.
Uras, M., "Signal Detection Methods for Magnetostrictive Sensors", 970604, reprinted from *Sensors and Actuators* 1997, SP–1220, Society of Automotive Engineers, Feb. 24, 1997, pp. 23–33.

*Primary Examiner*—Brian L. Johnson
*Assistant Examiner*—G B Klebe
(74) *Attorney, Agent, or Firm*—Dinnin & Dunn P.C.

(57) ABSTRACT

A pedestrian is sensed in a region of space external to a vehicle by generating a first magnetic flux at a first location on the vehicle so that the first magnetic flux extends into a region of space external of the vehicle, conducting the first magnetic flux through the region of space external to the vehicle to a second location on the vehicle, sensing the first magnetic flux at the second location, generating a signal responsive to the magnetic flux sensed at the second location, and discriminating a pedestrian when the pedestrian is located within the first magnetic flux, wherein the operation of discriminating is responsive to the signal.

30 Claims, 1 Drawing Sheet

U.S. PATENT DOCUMENTS

| | | | |
|---|---|---|---|
| 5,580,084 A | 12/1996 | Gioutsos | 280/735 |
| 5,629,619 A | 5/1997 | Mednikov | 324/207.16 |
| 5,646,613 A | 7/1997 | Cho | 340/903 |
| 5,707,076 A | 1/1998 | Takahashi | 280/735 |
| 5,739,757 A | 4/1998 | Gioutsos | 340/667 |
| 5,747,696 A | 5/1998 | Kwun et al. | 73/728 |
| 5,914,610 A | 6/1999 | Gershenfeld et al. | 324/663 |
| 6,039,345 A | 3/2000 | Cech et al. | 280/735 |
| 6,094,610 A | 7/2000 | Steffens, Jr. et al. | 701/45 |
| 6,097,332 A * | 8/2000 | Crosby, II | 342/72 |
| 6,203,060 B1 * | 3/2001 | Cech et al. | 280/735 |
| 6,213,512 B1 * | 4/2001 | Swann et al. | 280/806 |
| 6,225,918 B1 * | 5/2001 | Kam | 340/903 |
| 6,227,325 B1 * | 5/2001 | Shah | 180/274 |
| 6,246,230 B1 | 6/2001 | Mednikov | 324/207.16 |
| 6,317,048 B1 | 11/2001 | Bomya | 340/573.1 |
| 6,407,660 B1 | 6/2002 | Bomya | 340/436 |
| 6,433,688 B1 | 8/2002 | Bomya | 340/573.1 |

\* cited by examiner

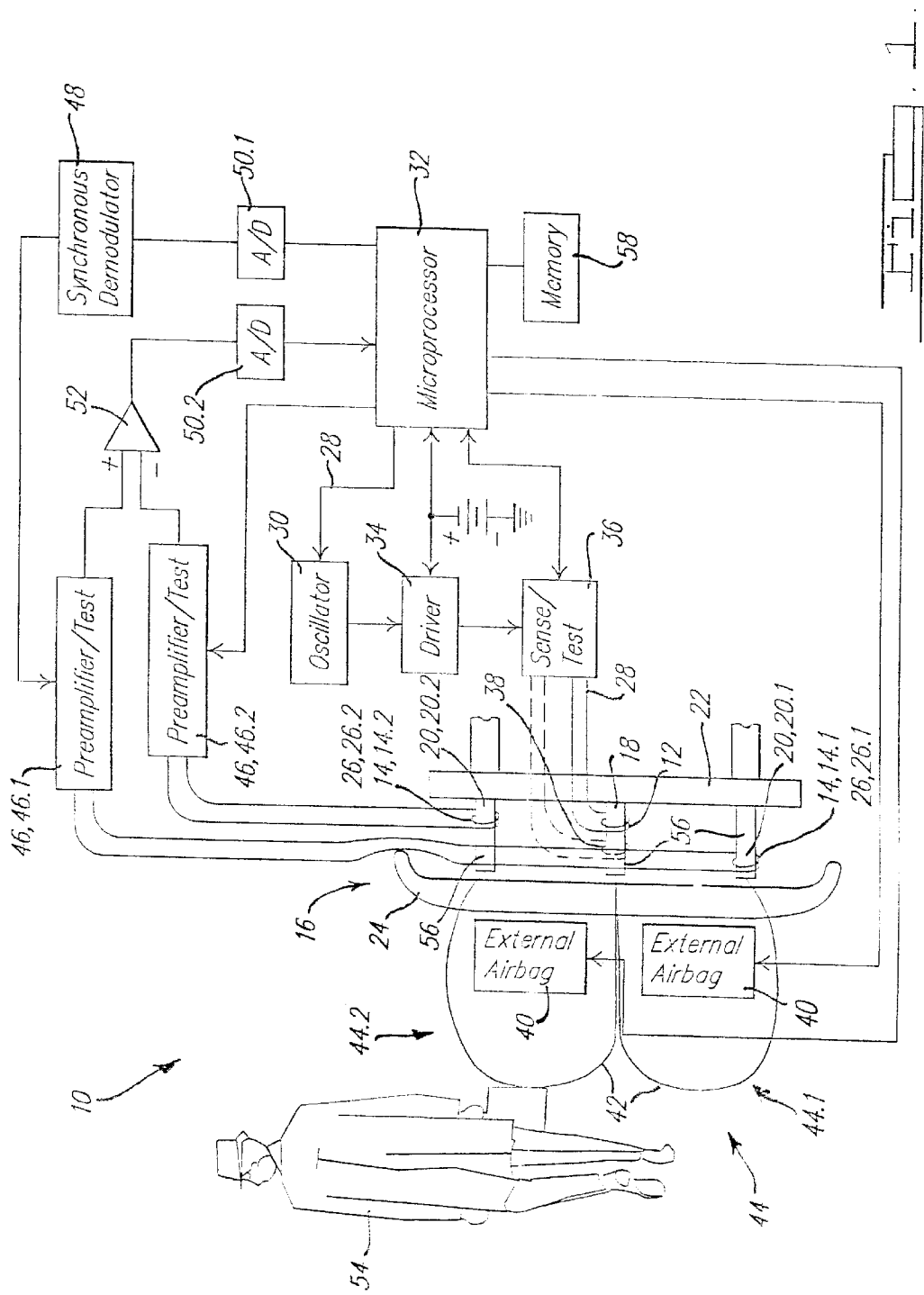

MAGNETIC SENSOR

CROSS-REFERENCE TO RELATED APPLICATIONS

The instant application claims the benefit of proir U.S. Provisional Application Ser. No. 60/150,868 filed on Aug. 26, 1999, which is incorporated herein by reference.

BRIEF DESCRIPTION OF THE DRAWINGS

In the accompanying drawing:

FIG. 1 illustrates a first embodiment of a magnetic sensor.

DETAILED DESCRIPTION OF EMBODIMENT(S)

Referring to FIG. 1, a magnetic sensor 10 comprises at least one first coil 12 and at least one magnetic sensing element 14 incorporated on a vehicle 16 proximate to the exterior thereof at respective first 18 and second 20 locations. For example, a first coil 12 is mounted at the center of a lateral ferromagnetic beam 22, such as a radiator support beam, at the front of the vehicle 16 proximate to and behind the front bumper 24, and a plurality of magnetic sensing elements 14.1, 14.2, for example a plurality of second coils 26.1, 26.2, are mounted at on the same lateral ferromagnetic beam 18 at left 20.1 and right 20.2 locations that are relatively distal with respect to the first location 18.

At least one first signal 28 comprising a sinusoidal voltage generated by an oscillator 30 is operatively applied to the at least one first coil 12. For example, the oscillator 30 may comprise a crystal stabilized (i.e. substantially drift-free) TTL square wave signal generated by a microprocessor 32 and subsequently filtered by a band-pass filter. The oscillation frequency of the oscillator 30 is selected, as a function of the expected noise sources, to enhance system performance. For example, a frequency different from that of AC power lines (e.g. 60 Hz) would be chosen to avoid interference therefrom. For example, an ultrasonic frequency might be used. The oscillator 30 may be modulated in amplitude, frequency, or by bursting. The signal from the oscillator 30 is fed to a coil driver 34, for example, through a buffer amplifier.

Each at least one first coil 12 is driven by an associated coil driver 34 that provides sufficient power at an impedance compatible with the first coil 12 so that the resulting magnetic field is sufficiently strong to be detected by the at least one magnetic sensing element 14. The coil driver 34 is also, for example, provided with short circuit protection and is operated so as to avoid saturation or clipping of the first signal 28. The coil driver 34 is designed to operate in an automotive environment, for example to operate over an associated range of possible battery voltages. The first signal 28 from the coil driver 34 may, for example, be either a voltage signal or a current signal.

The coil driver 34 drives the first coil 12 through a sense/test circuit 36. The sense/test circuit 36 senses either a current or voltage from the first coil 12, or a signal from a supplemental sense coil 38, or a combination of the three, to confirm or test the operation of the first coil 12. For example, a supplemental sense coil 38 would directly sense the magnetic flux 42 generated by the first coil 12. The sense/test circuit 36 may also, for example, test the first coil 12 for an open or short so as to improve the reliability of the magnetic sensor 10, particularly when used to control the actuation of a safety restraint actuator 40, so as to prevent a false deployment or a failure to deploy when necessary. The integrity, or health, of the at least one first coil 12 is tested every measurement cycle. The sense/test circuit 36 can also provide a measure of the power delivered to the first coil 12 which can provide an indication of the presence and type of object proximate thereto.

The at least one first coil 12 may, for example, be series resonated to increase the current flow therein, thereby increasing the amount of magnetic flux 42 generated by the at least one first coil 12. The magnetic flux 42 from the at least one first coil 12 extends into the region of space proximate thereto, in front of the vehicle 16, and is attracted to materials of relatively high permeance therein. The at least one first coil 12 is part of a magnetic circuit 44 that further comprises the regions of space between the at least one first coil 12 and the at least one magnetic sensing element 14. With a first coil 12 spanned by a plurality of magnetic sensing elements 14.1, 14.2, the magnetic circuit 44 can be considered as a superposition of left 44.1 and right 44.2 magnetic subcircuits. Increased magnetic flux 42 in the magnetic circuit 44 provides for a higher signal to noise ratio in the signal or signals received or detected by the magnetic sensor 10. The at least one first coil 12 may be compensated for variations in temperature by incorporating an associated temperature sensor.

The at least one magnetic sensing element 14 is responsive to the magnetic flux 42 at the at least one second location 20. An output from the at least one magnetic sensing element 14 is operatively connected to a preamplifier/test circuit 46 which, for example, buffers the magnetic sensing element 14 from loading by the subsequent circuitry and provides a relatively low impedance output so as to reduce noise. The preamplifier/test circuit 46 also amplifies the signal from the at least one magnetic sensing element 14 to a level sufficiently high to permit appropriate signal processing and demodulation before subsequent analog-to-digital conversion for processing by the microprocessor 32. The microprocessor 32 gathers data, monitors system health and integrity, and determines whether or not to actuate the safety restraint actuator 40.

The preamplifier/test circuit 46 also monitors the integrity of the magnetic sensing element 14, for example by comparing the signal therefrom with "expected" levels and expected wave shapes (e.g. a sinusoidal shape), providing a continuous test of the integrity of the magnetic sensing element 14. The preamplifier/test circuit 46 may also, for example, test the at least one magnetic sensing element 14, for example a second coil 26, for an open or short so as to improve the reliability of the magnetic sensor 10, particularly when used to control the actuation of a safety restraint actuator 40, so as to prevent a false deployment or a failure to deploy when necessary. The integrity, or health, of the at least one magnetic sensing element 14 is tested every measurement cycle.

The magnetic sensing element 14 senses from the magnetic flux 42 a sinusoidal carrier that is modulated responsive to the reluctance of the magnetic circuit 44.

In accordance with one aspect, the signal from the magnetic sensing element 14 is amplified by the preamplifier/test circuit 46, and a synchronous demodulator 48 operatively connected thereto extracts the modulation signal from the sinusoidal carrier. The output from the synchronous demodulator 48 is DC coupled the microprocessor 32 through an A/D converter 50.1.

Respective preamplifier/test circuits 46.1 and 46.2 are operatively coupled to respective magnetic sensing elements 14.1 and 14.2, and outputs from the respective preamplifier/ test circuits 46.1 and 46.2 are operatively coupled to respective differential inputs of a differential amplifier 52, the output of which is operatively connected the microprocessor 32 through an A/D converter 50.2.

The above described magnetic sensor 10 can be embodied in various ways. The particular circuitry, whether analog, digital or optical is not considered to be limiting and can be designed by one of ordinary skill in the art in accordance with the teachings herein. For example, where used, an oscillator, amplifier, logic element, modulator, demodulator, A/D converter can be of any known type, for example using transistors, for example field effect or bipolar, or other discrete components; integrated circuits; operational amplifiers, or logic circuits, or custom integrated circuits. Moreover, where used, a microprocessor can be any computing device.

Responsive to the at least one first signal 28, the at least one first coil 12 generates a magnetomotive force in the magnetic circuit 44 so as to generate a magnetic flux 42 therein. The at least one magnetic sensing element 14 at the at least one second location 20 senses the magnetic flux 42 thereat, which is responsive to the magnetomotive force from the at least one first coil 12 and to the magnetic properties of the magnetic circuit 44.

In operation, the at least one first signal 28 operatively coupled to the associated at least one first coil 12 by the associated at least one coil driver 34 causes a current flow in the at least one first coil 12 which generates a magnetic flux 42 in the magnetic circuit 44. A magnetic circuit 44 is characterized by a reluctance R, wherein the amount of flux $\phi$ in a magnetic circuit for a given magnetomotive force F is given by $\phi=F/R$. The reluctance R of a series magnetic circuit is given by the sum of the respective reluctances of the respective elements in series. The reluctance of air is significantly greater than that of a ferromagnetic material, and a ferromagnetic material entering the magnetic circuit 44 affects the reluctance R of the magnetic circuit 44, which in turn affects the amount of flux to which the magnetic sensing element 14 is exposed, and which is sensed thereby. A pedestrian 54 proximate to the front of the vehicle 16 can be sensed by the magnetic sensor 10 from the permeance of iron containing blood, which is sufficient to influence the magnetic flux 42 in the magnetic circuit 44 enough to be detectable by the magnetic sensing element 14.

The first coil 12 has a self-inductance having one value when the first coil 12 is in free space, and another when the coil is part of the magnetic circuit 44. In the latter case, the self inductance of the first coil 12 is dependent upon the magnetic properties of the magnetic circuit 44. Moreover, the magnetic properties of the magnetic circuit 44 are altered if ferromagnetic elements are brought in proximity with the magnetic circuit 44. Accordingly, a pedestrian 54 proximate to the front of the vehicle 16 can influence the self-inductance of the first coil 12, and can change the magnetic coupling between a first coil 12 at a first location 22 and the magnetic sensing element 14 at a second location 20.

The ferromagnetic elements in the front of the vehicle 16, can act as a magnetic lens to concentrate or focus the magnetic flux 42 within a region to be sensed. The magnetic flux 42 generally follows a path of least reluctance, which typically would correspond to sections of greatest amounts of magnetically permeable material. Accordingly, the magnetic circuit 44 may be augmented with ferrite or mu-metal elements, or permanent magnets, to further adjust the shape and extent of the magnetic field. For example, the first 12 and second 26.1, 26.2 coils can be wound around ferrite cores 56 to enhance their performance.

Both the power applied to the at least one first coil 12, and the gain and/or phase of the signal from the at least one magnetic sensing element 14 in relation to the at least one first signal 28, may be continuously monitored and stored in a memory 58 of a microprocessor 32 as a real-time magnetic signature of the pedestrian proximity condition. The real-time magnetic signature is compared with at least one other comparable magnetic signature—for example at least one normal magnetic signature representing an unobstructed vehicle or various magnetic signatures representing various pedestrian scenarios, or other obstructions—in order to determine if an associated safety restraint actuator 40, for example at least one external air bag, should be deployed to protect a pedestrian 54 from injury by the vehicle 18. The normal signature may be updated over time so as to track minor perturbations of the vehicle 16.

The magnetic sensor 10 provides a real-time validation of the health and integrity of the respective at least one first coil 12 and the at the second coils 26.1 and 26.2, by testing the respective coils for shorts or open conditions, or by using a separate sense coil 38 to detect the magnetic flux 42 generated by the at least one first coil 12.

The coils or sensing elements may incorporate a ferrite or other high permeability magnetic core. Also, highly-tuned coils can be used for magnetic signal generation. Moreover, the width and length of coil bobbins can be adapted to steer the magnetic flux 12.

The location, diameter and spacing of the at least one first coil 12 and the at least one second coil 26 can be adapted to maximize the performance of a signal from a human locator. Moreover, first 12 or second 26 coils located in the bumper, grill, hood and wiper gutter would allow the magnetic sensor 10 to follow the trajectory of the pedestrian 54 prior to impact so as to deploy the proper safety restrain system 40 at the proper time.

The signals associated with the magnetic sensor 10 can be generated, adapted or processed in a variety of ways, including but not limited to:

1. AM, FM or pulsed demodulation of the magnetic signature;
2. Multi-tone, multi-phase electronics;
3. A magnetically-biased, phase-shift oscillator for low-cost pure sine wave generation;
4. A coherent synthetic or phased-locked carrier hardware- or microprocessor-based system;
5. A system of microprocessor gain-or offset-tuning through D/A then A/D self-adjust or self-test algorithm;
6. Placing a "standard" in the system safing field for magnetic calibration;
7. Inaudible frequencies;
8. Microprocessor-generated crystal stabilized frequencies for stability, including microprocessor D/A converter for coherent sine-wave generation;
9. Wide-band system electronics;
10. Closed loop gain- and phase-control of the signal to a sending-coil (i.e. AGC with the magnetic circuit acting as a delay line), wherein the gain- and phase-control signals are used as sensor outputs;
11. Monitoring the power delivered by the coil driver, particularly the bypass power, in order to detect impacts near or at the hinge(s) magnetically energized with the at least one first coil;
12. A series-resonant coil driver-circuit to increase current to flow to the at least one first coil 12 so as to improve the signal-to-noise ratio, wherein the associated current to the at least one first coil 12 is monitored to provide a continuous self-test of the at least one first coil 12, as well as a measure of the power drawn by the at least one first coil 12; and 13. Using another type of magnetic sensing element 14, for example a Hall effect device, instead of a second coil 26.

The magnetic sensor 10 may be further adapted to detect a pedestrian 54 proximate to the vehicle 16 from the Doppler shift of the frequency of the magnetic flux 42 responsive to the pulsating blood flow of the pedestrian 54, so as to distinguish between animate or inanimate objects proximate to the vehicle. Infants are known to have a relatively fast heart rate which could be expected to provide a larger Doppler shift.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A method of sensing a pedestrian in a region of space external to a vehicle, comprising:
   a. generating a first magnetic flux at a first location on said vehicle so that said first magnetic flux extends into a region of space external of said vehicle;
   b. conducting said first magnetic flux through said region of space external to said vehicle to a second location on said vehicle;
   c. sensing said first magnetic flux at said second location;
   d. generating a signal responsive to said magnetic flux sensed at said second location; and
   e. discriminating a pedestrian when said pedestrian is located within said first magnetic flux, wherein the operation of discriminating is responsive to said signal.

2. A method of sensing a pedestrian in a region of space external to a vehicle as recited in claim 1, further comprising controlling the actuation of a safety restraint actuator to protect said pedestrian from a collision with the vehicle, wherein the operation of controlling the actuation of a safety restraint actuator is responsive to the operation of discriminating.

3. A method of sensing a pedestrian in a region of space external to a vehicle as recited in claim 1, wherein said first magnetic flux is oscillating.

4. A method of sensing a pedestrian in a region of space external to a vehicle as recited in claim 3, further comprising modulating a frequency of oscillation of said first magnetic flux.

5. A method of sensing a pedestrian in a region of space external to a vehicle as recited in claim 1, wherein said magnetic flux is generated with a first coil, further comprising determining a measure of power applied to said first coil and determining a proximity of an object to said vehicle body from said measure of power.

6. A method of sensing a pedestrian in a region of space external to a vehicle as recited in claim 1, wherein the operation of generating a first magnetic flux is responsive to a temperature proximate to said first location.

7. A method of sensing a pedestrian in a region of space external to a vehicle as recited in claim 1, wherein said second location comprises a plurality of second locations.

8. A method of sensing a pedestrian in a region of space external to a vehicle as recited in claim 7, wherein said plurality of second locations are laterally distal and proximate to a frontal portion of said vehicle.

9. A method of sensing a pedestrian in a region of space external to a vehicle as recited in claim 1, further comprising comparing said signal with a reference signal and discriminating said pedestrian responsive to the operation of comparing, wherein said operation of comparing comprises comparing waveform shapes of said signal and said reference signal and said reference signal is responsive to a first signal by which said magnetic flux is generated.

10. A method of sensing a pedestrian in a region of space external to a vehicle as recited in claim 1, wherein the operation of discriminating said pedestrian comprises comparing a phase of said signal with a phase of a first signal by which said magnetic flux is generated.

11. A method of sensing a pedestrian in a region of space external to a vehicle as recited in claim 1, wherein said first location is proximate to a laterally central region of a frontal portion of said vehicle.

12. A method of sensing a pedestrian in a region of space external to a vehicle as recited in claim 1, further comprising conducting said magnetic flux between said first and second locations through a ferromagnetic element proximate to a frontal portion of said vehicle.

13. A method of sensing a pedestrian in a region of space external to a vehicle as recited in claim 1, wherein said second location is proximate to a laterally distal region of a frontal portion of said vehicle.

14. A method of sensing a pedestrian in a region of space external to a vehicle as recited in claim 1, wherein the operation of generating a first magnetic flux at said first location comprises substantially resonating a coil at said first location.

15. A method of sensing a pedestrian in a region of space external to a vehicle as recited in claim 1, further comprising sensing said first magnetic flux proximate to said first location and generating a third signal responsive thereto, wherein said third signal is indicative of the operativeness of the operation of generating said first magnetic flux.

16. A magnetic sensor, comprising:
   a. a first coil at a first location of a body of a vehicle, wherein said first coil is operatively coupled to a ferromagnetic element of said vehicle body;
   b. at least one magnetic sensing element operatively connected to at least one second location of said body of said vehicle, wherein said first location and said at least one second location are in magnetic communication through a first portion of said vehicle and through a region of space external of said vehicle;
   c. a first signal operatively applied to said first coil;
   d. a means for sensing at least one second signal from said at least one magnetic sensing element;
   e. a means for discriminating a pedestrian from said at least one second signal.

17. A magnetic sensor as recited in claim 16, wherein said first coil is located proximate to a laterally central region of a frontal portion of said vehicle.

18. A magnetic sensor as recited in claim 16, wherein at least one of said first coil and said at least one magnetic sensing element is operatively coupled to a lateral ferromagnetic beam proximate to a frontal portion of said vehicle.

19. A magnetic sensor as recited in claim 18, wherein at least one of said first coil and said at least one magnetic sensing element is around a ferromagnetic element operatively coupled to or a part of said lateral ferromagnetic beam.

20. A magnetic sensor as recited in claim 16, wherein said at least one magnetic sensing element is selected from at least one coil and at least one Hall-effect sensor.

21. A magnetic sensor as recited in claim 16, wherein said at least one magnetic sensing element is located proximate to a laterally distal region of a frontal portion of said vehicle.

22. A magnetic sensor as recited in claim 16, wherein said at least one magnetic sensing element comprises a plurality of magnetic sensing elements.

23. A magnetic sensor as recited in claim 22, wherein said plurality of magnetic sensing elements are located at distinct second locations.

24. A magnetic sensor as recited in claim 23, wherein said distinct second locations are laterally distal and proximate to a frontal portion of said vehicle.

25. A magnetic sensor as recited in claim 16, wherein at least one of said first coil and said at least one magnetic sensing element is operatively coupled to a magnetic element comprising a ferrite or mu-metal material.

26. A magnetic sensor as recited in claim 16, wherein said first signal is an oscillating signal.

27. A magnetic sensor as recited in claim 27, wherein a frequency of said first signal is modulated.

28. A magnetic sensor as recited in claim 16, further comprising a first circuit operatively connected to said first coil, wherein said first signal is applied to said first coil by said first circuit and said first circuit is adapted so that said first coil is substantially in resonance by said first signal.

29. A magnetic sensor as recited in claim 16, further comprising a first circuit operatively connected to said first coil, wherein said first signal is applied to said first coil by said first circuit, and said first circuit determines a measure of power delivered to said first coil from said first signal.

30. A magnetic sensor as recited in claim 16, further comprising at least one second magnetic sensing element proximate to said first coil for testing the operativeness of said first coil.

* * * * *

UNITED STATES PATENT AND TRADEMARK OFFICE
CERTIFICATE OF CORRECTION

PATENT NO. : 6,631,776 B1  Page 1 of 1
DATED : October 14, 2003
INVENTOR(S) : Timothy J. Bomya It is certified that error appears in the above-identified patent and that said Letters Patent is hereby corrected as shown below:

Column 8,
Line 3, "claim 27" should be changed to -- claim 26 --.

Signed and Sealed this

Twenty-eighth Day of December, 2004

JON W. DUDAS
*Director of the United States Patent and Trademark Office*